United States Patent
Netzer (10) Patent No.: US 11,460,113 B2
(45) Date of Patent: Oct. 4, 2022

(54) GATE VALVE WITH SLIDING GUIDE

(71) Applicant: VAT Holding AG, Haag (CH)

(72) Inventor: Martin Netzer, Bludenz (AT)

( * ) Notice: Subject to any disclaimer, the term of this patent is extended or adjusted under 35 U.S.C. 154(b) by 0 days.

(21) Appl. No.: 17/431,386

(22) PCT Filed: Feb. 12, 2020

(86) PCT No.: PCT/EP2020/053596
§ 371 (c)(1),
(2) Date: Aug. 16, 2021

(87) PCT Pub. No.: WO2020/165248
PCT Pub. Date: Aug. 20, 2020

(65) Prior Publication Data
US 2022/0136609 A1    May 5, 2022

(30) Foreign Application Priority Data
Feb. 15, 2019   (DE) .................. 10 2019 001 115.5

(51) Int. Cl.
*F16K 3/02* (2006.01)
*F16K 3/18* (2006.01)
(Continued)

(52) U.S. Cl.
CPC ............ *F16K 3/0218* (2013.01); *F16K 3/182* (2013.01); *F16K 3/184* (2013.01); *F16K 31/5286* (2013.01); *F16K 51/02* (2013.01)

(58) Field of Classification Search
CPC ........ F16K 51/02; F16K 3/0218; F16K 3/182; F16K 3/18; F16K 3/184; F16K 31/5286
See application file for complete search history.

(56) References Cited

U.S. PATENT DOCUMENTS

| 2,841,361 A | 7/1958 | Palmer |
| 2,895,709 A * | 7/1959 | Frieda ................ F16K 3/184 251/266 |

(Continued)

FOREIGN PATENT DOCUMENTS

| DE | 227471 A | 10/1910 |
| DE | 2839797 A1 | 3/1980 |

(Continued)

OTHER PUBLICATIONS

"Notification of Transmittal of the International Search Report and the Written Opinion of the International Searching Authority, or the Declaration," International Filing Date: Feb. 12, 2020, International Application No. PCT/EP2020/053596, Applicant: VAT Holding AG, dated May 8, 2020, pp. 1-9.

(Continued)

*Primary Examiner* — David Colon-Morales (57) ABSTRACT

The invention relates to a vacuum valve for the substantially gas-tight closure of an opening, comprising a closure element having a closure side and a coupling unit arranged on a rear side opposite the closure side, and a valve wall having valve seat surrounding the opening. The valve further comprises a linear drive unit enabling the closure element to be adjustable in at least two adjustment directions. The closure element is adjustable between an open position releasing the opening, an intermediate position pushed over the opening and a closed position closing the opening. The vacuum valve comprises a guide for the closure element associated with the opening. The closure element comprises a guide element interacting with the guide during an adjustment from the open position to the closed position and back.

17 Claims, 3 Drawing Sheets

(51) Int. Cl.
*F16K 31/528* (2006.01)
*F16K 51/02* (2006.01)

(56) References Cited

U.S. PATENT DOCUMENTS

| | | | |
|---|---|---|---|
| 4,491,145 A | | 1/1985 | Williams et al. |
| 4,634,094 A | * | 1/1987 | Geiser ................. F16K 31/5282 74/25 |
| 5,415,375 A | | 5/1995 | Gaboriault |
| 5,755,426 A | * | 5/1998 | Boesch .................. F16K 51/02 251/193 |
| 5,769,952 A | | 6/1998 | Komino |
| 6,056,266 A | | 5/2000 | Blecha |
| 6,089,537 A | | 7/2000 | Olmsted |
| 6,095,180 A | * | 8/2000 | Ishigaki ................ F16K 49/002 137/341 |
| 6,237,892 B1 | * | 5/2001 | Ito ........................... F16K 3/184 251/193 |
| 6,416,037 B1 | | 7/2002 | Geiser |
| 6,471,181 B2 | * | 10/2002 | Duelli ..................... F16K 51/02 251/193 |
| 6,488,262 B1 | * | 12/2002 | Oka ........................ F16K 3/182 251/193 |
| 6,966,538 B2 | * | 11/2005 | Hayashi .................. F16K 51/02 251/327 |
| 7,066,443 B2 | * | 6/2006 | Ishigaki .................. F16K 3/184 251/195 |
| 7,735,804 B2 | * | 6/2010 | Chu ........................ F16K 3/184 251/204 |
| 7,980,529 B2 | | 7/2011 | Seitz |
| 8,215,612 B2 | * | 7/2012 | Ehrne ..................... F16K 51/02 251/204 |
| 9,470,319 B2 | * | 10/2016 | Yang ..................... F16K 3/0254 |
| 9,599,233 B2 | * | 3/2017 | Ishigaki ................ F16K 3/0281 |
| 9,995,402 B2 | * | 6/2018 | Kim ....................... F16K 3/0218 |
| 10,156,299 B2 | * | 12/2018 | Netzer ....................... F16K 1/24 |
| 10,364,901 B2 | * | 7/2019 | Iwabuchi .............. F16K 3/0281 |
| 10,563,775 B2 | * | 2/2020 | Kim ....................... F16K 3/0254 |
| 2005/0139799 A1 | * | 6/2005 | Tomasch ................. F16K 3/18 251/193 |
| 2006/0033061 A1 | | 2/2006 | van Mast et al. |
| 2011/0220828 A1 | | 9/2011 | Kennedy |
| 2017/0356569 A1 | | 12/2017 | Netzer et al. |

FOREIGN PATENT DOCUMENTS

| | | |
|---|---|---|
| EP | 3239567 A1 | 11/2017 |
| GB | 257254 A | 9/1926 |

OTHER PUBLICATIONS

"German Search Report and Written Opinion: Recherchebereicht," German Application No. 10 2019 001 115.5, dated Oct. 22, 2020, pp. 1-8.

* cited by examiner

Fig. 3

GATE VALVE WITH SLIDING GUIDE

CROSS-REFERENCE TO RELATED APPLICATIONS

The present application is the National Stage of International Application No. PCT/EP2020/053596, filed on Feb. 12, 2020, which claims priority from German patent application No. 10 2019 001 115.5 filed on Feb. 15, 2019, the disclosure of both of which should be understood to be incorporated into this specification.

The invention relates to a vacuum valve for substantially gas-tight closure of an opening or volume according to the preamble of claim 1.

In general, vacuum valves for the substantially gas-tight closure of a flow path, flow path or jet path leading through an opening formed in a valve housing are known in various embodiments from the prior art. Vacuum slide valves are used in particular in the field of IC and semiconductor manufacturing but also, for example, in the field of electron microscopy, which must also take place in a protected atmosphere as far as possible without the presence of contaminating particles.

For example, in a production system for semiconductor wafers or liquid crystal substrates, the highly sensitive semiconductor or liquid crystal elements pass sequentially through several process chambers in which the semiconductor elements located within the process chamber are processed by means of a processing device in each case. Both during the machining process within the process chamber and during transport from process chamber to process chamber, the highly sensitive semiconductor elements must always be in a protected atmosphere—in particular in a vacuum. In addition, vacuum valves are also used in the field of battery production, wherein atmospheric separation of a process area from an ambient atmosphere is also provided. The process chambers are connected to one another, for example, via connecting passages, wherein the process chambers can be opened by means of vacuum slide valves for transferring the parts from one process chamber to the next and subsequently closed in a gas-tight manner for carrying out the respective manufacturing step. Due to the field of application described, such valves are also referred to as vacuum transfer valves and, due to theft rectangular opening cross-section, as rectangular slide valves.

Various embodiments of vacuum valves, in particular their sealing and drive technology, are also known from the prior art. Depending on the respective drive technology, a distinction is made in particular between vacuum slide, valves or slide valves, also called valve slides or rectangular slide valves, and pendulum valves, wherein closing and opening in the prior art usually takes place in two steps.

In a first step, a valve closure, in particular a closure disk, is displaced linearly over an opening essentially parallel to the valve seat in the case of a slide valve, as known for example from U.S. Pat. No. 6,416,037 (Geiser) or U.S. Pat. No. 6,056,266 (Blecha), or in the case of a pendulum valve, as known, for example, from U.S. Pat. No. 6,089,537 (Olmsted), is pivoted about a pivot axis over the opening without contact between the closure disk and the valve seat of the valve housing. In a further step, the closure disk is pressed with its closure side onto the valve seat of the valve housing so that the opening is sealed in a gas-tight manner. The sealing can be achieved, for example, either via a sealing ring arranged on the closure side of the closure disk, which is pressed onto the valve seat surrounding the opening, or via a sealing ring on the valve seat, against which the closure side of the closure disk is pressed.

U.S. Pat. No. 5,769,952 (Komino) discloses a slide valve in the form of a vacuum transfer valve which essentially consists of a linear actuator, a push rod which can be moved linearly along its push rod axis, and a closure disk. The closure disk is connected to the push rod via two legs. By moving the push rod linearly along the push rod axis in the closing direction, the closure disk can be moved in parallel across the valve opening, with the closure disk being disposed in the opposite position to the valve seat surrounding the opening. The two legs are each mounted at one leg end on a crossbar extending transversely to the push rod and running parallel to the valve seat plane, and each mounted at the other leg end on the closure disk so as to be pivotable by means of a pivot bearing. Both legs are arranged parallel to each other in the direction of the crossbar and have a common geometric pivot axis on both the closure disk and the crossbar. The legs hold the closure disk in such a way that the geometric pivot axis on the crossbar side is located below the pivot axis on the closure-part side with respect to the closing direction of the linear adjustment travel of the push rod, so that a force acting on the closure disk against the closing direction of the push rod leads to a reduction in the distance between the two pivot axes with respect to the closing direction. A guide roller is arranged at the end of the linear adjustment path of the closure disk. If contact occurs between the closure disk and the guide roller, the closure disk can no longer be adjusted further in the closing direction. However, the linear adjustment drive continues to exert a force on the closure disk so that the legs swing out, thus approaching the perpendicular position to the linear adjustment direction and acting as a lever. The closure disk is thus adjusted in the direction of the valve seat and pressed onto it.

One advantage of such a gate with a leg mechanism is the relatively simple design of the drive, since the push rod only has to be displaced linearly. One problem, however, is the forces acting perpendicularly on the push rod axis, which must be absorbed by the push rod bearing. Since the closure disk needs to be supported on the guide roller and must therefore absorb large forces, the closure disk must be of large dimensions. Due to the arrangement of the pivot axes, parallel alignment of the closure disk with the valve seat is not ensured, which is why the closure disk initially sits at an angle when contacting the valve seat, shear forces on the seal are unavoidable and no evenly distributed contact pressure is ensured. By using the guide roller and the pivot bearings, the generation of particles, in particular due to friction, cannot be prevented, which is why freedom from particles is not guaranteed.

U.S. Pat. No. 7,980,529 shows a vacuum slide valve in which a closure part is mounted on a linearly adjustable push rod by means of two legs which can be pivoted in the manner of a parallelogram and are spaced parallel in the direction of adjustment of the push rod. Due to the parallelogram-like mounting via the legs, the closure part is always aligned parallel to the push rod and the valve seat. In a state in which the closure part is pivoted out in the closing direction of the linearly adjustable push rod, the closure part is pushed parallel over the opening of the valve by linear adjustment of the push rod until the closure part contacts a stopper mounted above the opening. The stopper prevents the closure part from moving further in the closing direction. However, as the push rod continues to be adjusted in the closing direction, the legs swing out in the direction of the valve seat so that the closure part is pressed onto the valve seat and the opening is thus closed.

Also shown in U.S. Pat. No. 4,491,145 (Williams et al.), U.S. Pat. No. 5,415,375 (Gaboriault), U.S. Pat. No. 2,841,361 (Palmer) and GB 257,254 are slide valves with such parallelogram guided, mechanically mounted legs for pressing a valve closure onto a valve seat by pivoting out the legs. Common to these embodiments is that their operation is associated with relatively large particle generation due to the numerous friction points, in particular the leg bearings, and use in the high-purity vacuum range, in which the free particles must be kept to a minimum, is largely ruled out.

For vacuum or high vacuum applications, in which relatively large workpieces are to be processed, the closure element can be much larger than is necessary, for example, for closing a vacuum chamber of an electron microscope. For this purpose, the closure element must often be designed in such a way that large parts can also be inserted into the vacuum chamber. In particular, the closure can be designed in the form of a door or gate. In this case, the weight of the closure alone causes additional stress on the valve.

The larger the dimensions of the closure element, the greater the forces that act during a closing or opening movement of the closure. In the case of a vertically closing and opening valve gate, for example, the kinetic energy of motion of the gate must be converted into potential position energy when the valve closes. It is of interest in this case that the closing process takes as little time as possible, i.e. that the movement of the gate takes place comparatively fast. This desired speed in the processing of workpieces also contributes to the magnitude of the kinetic energy of the gate generated in the process. The critical factor here is consequently the wear of the individual valve parts due to the desired rapid movement acceleration and deceleration—of relatively large masses. In particular, wear occurs on those valve parts which are intended for braking or limiting the movement of the closure.

At the same time, due to the rapid movement and size, difficulties often arise with regard to reliably ensuring a gas-tight seal of a chamber.

It is therefore the object of the present invention to provide a vacuum valve, in particular for the machining of relatively large workpieces, in particular a door or gate valve, which exhibits an improvement with respect to its wear properties.

In particular, it is an object of the invention to provide a gate valve that offers reliable closure of an opening with reduced or eliminated particle formation.

These objects are solved by the realization of the characterizing features of the independent claims. Features which further form the invention in an alternative or advantageous manner are to be taken from the dependent claims.

The invention relates to a vacuum valve, in particular a vacuum gate valve, for substantially gas-tight closure of an opening defining an opening axis. The valve has a closure element with a closure side and a coupling unit, in particular a lever mechanism, which is arranged on a rear side opposite the closure side. The valve has a valve wall surrounding the opening with a valve seat and a linear drive unit, by means of which the closure element can be adjusted in at least two adjustment directions essentially orthogonally to the opening axis along an adjustment axis and thus the closure element can be moved between an open position releasing the opening, an intermediate position slid over the opening, in which the closure element is located at least partially in a substantially parallel spaced-apart opposite position to the valve seat, and a closed position closing the opening, wherein the closure element is pressed with its closure side onto the valve seat and closes the opening, in particular closes it in a gas-tight manner.

The linear drive unit can, for example, be designed as a drive cylinder which, in particular, has an internal damping mechanism and/or a corresponding damping control in order to brake the movement of the closure (valve disk or gate) in advance or to achieve a pre-damped closing movement when the closure is closed.

The vacuum valve also has a guide for the closure element assigned to the opening or the valve wall. The guide is arranged in particular fixed relative to the valve housing. The closure element is arranged and designed to be movable relative to the guide. The closure element further comprises a guide element cooperating with the guide during an adjustment from the open position to the closed position or the intermediate position, and back. The guide element is accordingly movable relative to the guide.

The guide and the guide element are shaped and interact in such a way that, during adjustment from the intermediate position to the closed position, a tilting of the closure element transverse to the adjustment axis is initiated and/or effected in a first partial movement.

In particular, this initiates and causes a transverse movement of part of the closure element transverse to the adjustment axis, especially with a predominantly orthogonal directional component.

The interaction of guide element and guide, e.g. a gate-like guide with a roller running in or on the gate, allows the valve closure (e.g. disk or gate closure) to be guided and pressed in such a way that, i.e. when the closure side is brought into contact with the valve seat, there is a dominant movement of the closure orthogonally to the valve seat surface and no or only very slight transverse load on the sealing material between the valve seat and closure. For this purpose, the guide or the gate can be designed, for example, with a curve-like (curved) surface, which causes a corresponding deflection of the direction of the closing movement of the closure in the final phase of the closing process.

In particular, the tilting of the closure element can be pronounced such that a part of the closure side is pressed onto the valve seat and is in contact with the valve seat at least along a touchdown line, wherein the touchdown line is essentially orthogonal to the opening axis as well as orthogonal to the adjustment axis. The closure element is then pressed onto the valve seat with one side, wherein an intermediate sealing material ensures a gas-tight transition in this area.

In one embodiment, during the adjustment from the intermediate position to the closed position, the closure element can be pressed with its closure side onto the valve seat in a second partial movement in such a way that there is circumferential contact between the valve seat and the closure side and the opening is closed. When the closed position is reached, a sealing surface of the closure element can then rest completely on an opposite sealing surface of the valve seat. The intermediate sealing material can be compressed along its entire length and thus provide a desired sealing effect.

In particular, the second partial movement has a rotational movement of the valve closure about the touchdown line (as a rotational axis), in particular wherein the partial movement corresponds to a rotation of the valve closure about the touchdown line.

According to one embodiment of the invention, the guide provides a stop for the guide element, wherein the first partial movement is limited by the guide element striking the stop and the second partial movement is initiated with the striking.

Such a stop can be provided, for example, by a closed end of the guide or a movement-limiting stop element in the course of the guide.

However, a push rod or coupling rod of the drive unit can, for example, continue to be adjusted in the closing direction after it has been struck, as a result of which, for example, two legs (pivoting elements) pivot out in the direction of the valve seat so that the closure part is pressed onto the valve seat and the opening is thus closed.

In one embodiment, the guide can be shaped in such a way that, during a displacement from the open position to the intermediate position and back, a linear movement of the entire closure element takes place along the adjustment axis and, within the scope of the first partial movement, a transverse movement of at least part of the closure element that deviates from the alignment of the adjustment axis takes place, resulting in a tilting of the closure element. The linear movement along the adjustment axis is superimposed in particular by a transverse movement.

The guide has in particular a depression, elongated recess, channel or groove defining a guide path or is designed as such. Such an embodiment, in which the guide element is moved, for example in the form of a roller, provides a kind of guide for the movement of the closure element. The closure element can thus be moved very precisely and in a predetermined manner solely by means of a linear drive unit.

In particular, the guide allows the closure element to move with only one degree of freedom of movement, especially wherein the degree of freedom of movement is defined by the guide path. The closure element can only be moved in two opposite directions (closing and opening).

In particular, the guide path has an at least partially curved, especially curve-shaped, course in a region defining the adjustment from the intermediate position to the closed position. The curved path is designed in particular in such a way that the curvature points in the direction of the valve seat (with respect to the closing process).

In particular, the guide is designed with a flat, in particular wedge-shaped, surface profile of the guide surface extending transversely to the adjustment axis or with a curved, in particular curvilinear, surface profile of the guide surface. The surface is designed in particular in such a way that the course has a homogeneous curvature or at least a constant direction of curvature. Such a shape of the surface makes it possible to realize a flowing closing movement of the gate.

According to the invention, in particular, the transverse movement of the closure element is superimposed on the displacement movement substantially parallel to the valve seat during the displacement from the open position to the closed position.

Depending on the embodiments of the guide and guide element, the guide element, in a particular embodiment, may be configured to engage the guide and provide guidance of the closure element thereby.

In one embodiment, the guide element can have a sliding element or a roller or be designed as such. The guide element is preferably designed as a roller or (rounded) sliding element for deflecting the direction of movement. The surface of such a deflecting means can, for example, be designed hardened in a special way to reduce possible wear. Alternatively, the running surface can, for example, be rubberized, i.e. provided with an elastic rubber-like material, e.g. polymer, for the purpose of a preferably low-impact and smooth guidance of the closure element during the closing process.

According to a particular embodiment, the guide element can be rigidly connected to the closure element. In an alternative embodiment, the guide element is arranged so as to be positionally variable, in particular pivotable, relative to the closure element.

The coupling unit can also have a further guide element that interacts with the guide at least during the movement from the intermediate position to the closed position. In particular, the further guide element interacts with the guide during the entire movement sequence from the open position to the closed position (and back).

According to one embodiment of the invention, the coupling unit has a retaining element rigidly arranged on the rear side of the closure element, a pivoting element pivotally mounted on the rear side of the closure element, and a restoring element connected to the retaining element and the pivoting element.

The restoring element is designed in particular as a spring, especially a spiral spring, or as an elastic element and is pretensioned in the open position and the intermediate position.

The pretension can hold the pivoting element in a folded normal position. Due to the applied restoring force and the position of the pivoting element in the folded normal position, the closure element can be present or held in the open position and in the intermediate position in a defined, essentially parallel, spaced-apart opposite position to the valve seat.

A restoring force provided by the restoring element can then increase as part of the second partial movement into the closed position (i.e., after the stop has been reached, for example) with the restoring force counteracting the direction of the second partial movement into the closed position. In particular, a spring is tensioned further in the process.

The increase in the restoring force can be due to a pivoting out of the pivoting element, which is formed, for example, as a leg. A distance between the retaining element and a fastening point for the restoring element on the pivoting element preferably increases in the process.

In particular, during the second partial movement, pivoting out of the pivoting element occurs, thereby pressing the closure element with its closure side onto the valve seat in such a way that contact between the valve seat and closure side is created circumferentially and the opening is closed.

The restoring element (in particular one or more springs) can thus hold part of the closure element at a defined distance from the valve wall or its valve seat for most of the movement distance (until movement from the intermediate position to the closed position or vice versa) during a closing or opening process of the valve. This reliably ensures that no undesired contact occurs between the closure element and the valve wall during the movement. Unwanted particle formation due to material abrasion can thus be reliably prevented.

A further advantage of the present invention results from the interaction of the two approaches mentioned above, i.e. an energy absorption of the restoring element by a movement of the closure element transverse to the adjustment axis (with at least one movement component orthogonal to the axis). In this way, it can be achieved that the movement of the closure arrangement is decelerated before the closure position is reached, since part of the kinetic energy of motion is converted into tension energy of the restoring element.

Due to the thus slowed down movement, the actual closing of the opening in the last phase of the movement can be more precise and controlled in an optimized way.

The damping of the closing movement can therefore take place by means of two components—linear drive unit and restoring element—in two phases one after the other or overlapping in terms of time and effect. The drive unit, for example, initially performs a kind of pre-damping (coarse damping) and thus already significantly slows down the closing movement, wherein a further damping effect (fine damping) is provided by the energy absorption of the restoring element.

Accordingly, with respect to the restoring element, one embodiment of the invention provides such an arrangement of the restoring element that the transverse movement of the closure element, when moving from the intermediate position to the closed position, causes an increase in the restoring force, and the increase in the restoring force causes a damping of the movement of the closure element when moving from the intermediate position to the closed position.

In a more specific embodiment, the guide has at least two guide rails, which are arranged and spaced apart on the valve wall.

The device according to the invention is described in more detail below by means of specific exemplary embodiments shown schematically in the drawings, purely by way of example, and further advantages of the invention are also discussed. The figures show in detail.

Figure 1A:
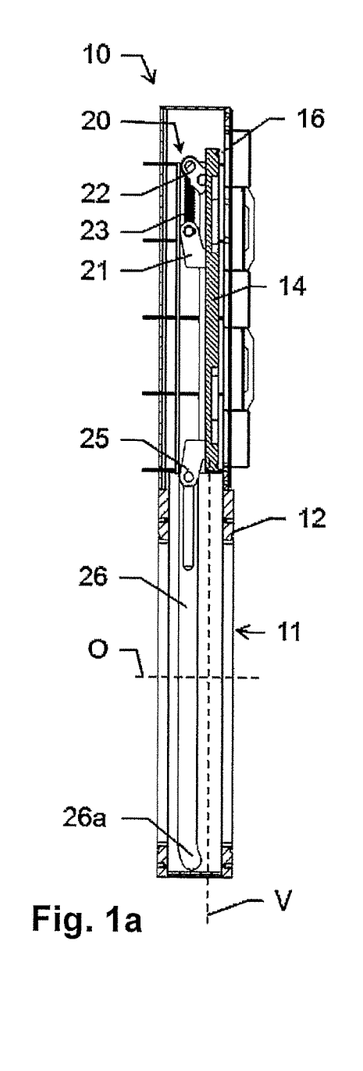
FIGS. 1a-c show an embodiment of a vacuum valve according to the invention for closing an opening or for sealing a volume in cross-section in different positions.

FIG. 1a shows a cross-sectional view of a valve 10 according to the invention, which is designed to close off an opening 11. The valve 10 has a valve wall 12 with a valve seat. The valve seat surrounds the opening 11 and corresponds with its shape and size to a bearing surface of a closure element 14. In the example shown, the closure element 14 is designed as a comparatively large-dimensioned gate or door, but can alternatively be designed, for example, as a round valve disk or in an alternative shape known to the person skilled in the art—for example, elongated or rectangular. The closure element 14 is also referred to as a valve disk.

In the embodiment shown, a seal 16 is applied to the closure side 15 of the closure element 14, in particular to be bearing surface. This seal 16 may, for example, be vulcanized onto the closure element 14 as a polymer by means of vulcanization. Alternatively, the seal 16 may be implemented, for example, as an O-ring in a groove of the closure element 14. Also, a sealing material may be bonded to the closure element 14, thereby embodying the seal 16. In an alternative embodiment, the seal 16 may be arranged on the side of the valve wall 12, in particular on the valve seat. Combinations of these embodiments are also conceivable.

The closure element 14 has a coupling unit 20 which is connected to a drive unit, e.g. motor, pneumatic or hydraulic, via a coupling rod 19 and by means of which the closure element 14 can be moved linearly along an adjustment axis V in a controlled manner. The adjustment axis V is aligned at least substantially orthogonally to an opening axis O defined by the opening 11.

The coupling unit 20 has a retaining element 21, which is connected to the closure element 14 in a fixed and rigid positional relationship, and a pivoting element 22, which is pivotally mounted relative to the closure element 14. The retaining element 21 and the pivoting element 22 are coupled to each other by means of a restoring element 23, in this case a spiral spring. In the embodiment shown, the coupling rod 19 is connected to the pivoting element 22.

In the open position shown, the restoring element 23 is in a pretensioned state and thus causes a transverse position of the pivoting element 22 relative to the valve disk 14. This transverse position results in such a holding of the valve disk 14 that the valve disk 14 is at a defined distance from the valve wall 12. Due to the pretensioning, the distance between the valve wall 12 and the closure element 14 can be reliably provided during the opening of the valve and during the closing movement until immediately before the actual closing of the valve. This advantageously reliably prevents possible particle formation in the event of contact between these parts and a simultaneous relative movement parallel to the adjustment axis V (transverse stress on the seal).

The closure element 14 further comprises a guide element 25, for example a roller, a wheel or a slider. The person skilled in the art is aware of further alternative design possibilities for this with the same effect, which are also regarded as guide element 25 in the sense of the invention. The guide element 25 is present in a guide 26 of the valve 10. The interaction of guide 26 and guide element 25 provides adjustability of the closure element 14 largely linearly along the axis of adjustment V. The guide 26 is designed as an elongated recess (groove) and thus defines a guide path along which the guide element 25 can be moved in two directions.

The guide 26 is connected to the valve 10, in this case rigidly to the valve wall 12. As shown here, the guide 26 can provide a guide surface with a curved surface profile in cross-section. According to alternative embodiments, the surface progression may be non-curved (flat) and formed transversely to the adjustment axis K. Mixed forms of a curved and a flat guide surface are also possible.

The guide 26 has a curvature 26a in the area of its closed end limiting the movement of the guide element 25. The curvature 26a faces in the direction of the valve seat. In other words, the curvature 26a defines the course of the guide path in such a way that the distances of points on the guide path lying adjacent to each other in the direction towards the end of the guide 26 to the valve wall (with respect to a respective normal of the valve wall) become smaller. As a result, the linear movement of the shutter plate 14, which is exclusively present over most of the adjustment path, is partially superimposed with a transverse movement during the movement into the closed state of the valve 10 (FIG. 1c), so that the closure element 14, in the last movement section of the closing movement, is no longer moved exclusively linearly parallel to the adjustment axis V, but (also) transversely to this axis, in particular with continuous change of the direction of movement. This results in a tilting of the closure element 14.

Figure 2A:
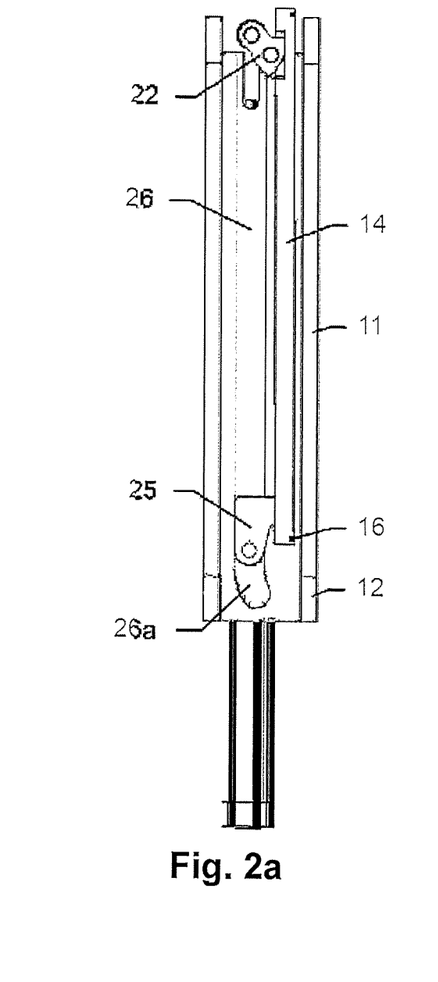
FIGS. 2a-c show a further embodiment of a vacuum valve, according to the invention in different states.

By means of the drive, the closure element 14 together with the guide element 25 and coupling unit 20 can initially be moved into an intermediate position (cf. state of the closure element in the embodiment according to FIG. 2a). The state of the coupling element 20 here corresponds essentially to the state in the open position.

The coupling element 20 has at least one further guide element (e.g. one or two further roller(s)), which is arranged on the retaining element 21 and/or on the pivoting element 22. Depending on the shape of the guide 26, this further guide element is always in cooperation with the guide 26 or is brought into cooperation with the guide 26 in the course of the movement from the open position into the closed position, in particular into the intermediate position. In the example shown, the further guide element is coupled to the pivoting element 22.

During further movement along the guide path, i.e. an adjustment from the intermediate position to the closed position, the closure element 14 is adjusted in two stages and accordingly assumes two different states.

Figure 1B:
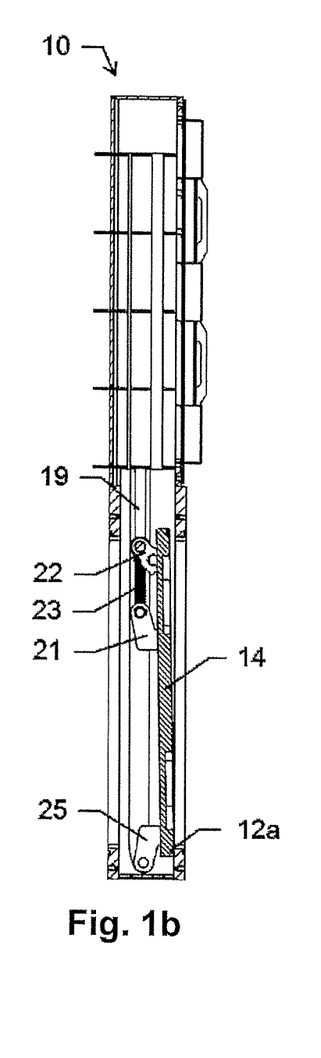

In the first stage, i.e. a first partial movement, the guide element 25 is moved along the curvature 26a, causing a tilting movement of the closure element 14 relative to the adjustment axis V and pressing a part of the closure side 15 onto the valve seat and in contact with the valve seat at least along a touchdown line 12a. Here, in particular, the seal 16 is pressed onto the opposite valve seat in this area. This state is shown in FIG. 1b. The opening 11 is not yet closed. The state of the coupling element 20 here continues to correspond essentially to the state in the open position. The coupling element 20 is guided by means of the guide 26.

The curvature 26a of the surface of the guide 26 offers the advantage that the movement of the closure 14 can be guided in such a way that, at the time of contact between the seal 16 and the valve seat, the movement has already at least partially or largely, in particular completely, changed into an orthogonal transverse movement and thus there is no or only very little transverse stress on the sealing material during contact. This means that potential particle abrasion can be largely or completely prevented.

Figure 1C:
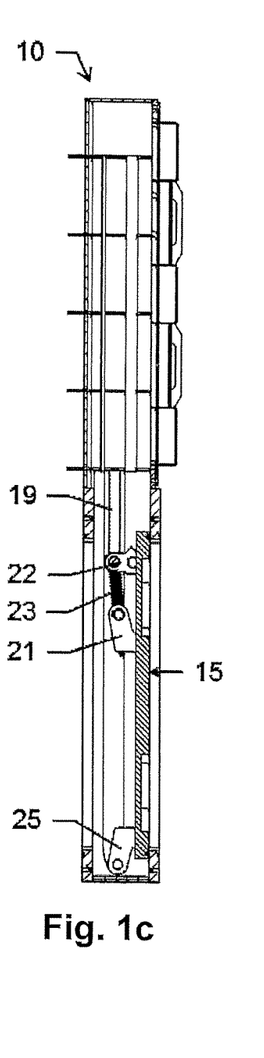

Within the scope of the second stage, i.e. a second partial movement, no further movement of the closure element 14 takes place in the direction of the adjustment axis V, but a part of the closure element 14 is merely moved transversely, in particular orthogonally, with respect to the adjustment axis V. In particular, a rotation of the closure element 14 about the touchdown line 12a takes place. This rotation results in a closing of the opening 11 by a complete pressing of the closure side 15 along the valve seat (closed position; FIG. 1c). In the course of the second partial movement, the pivoting element 22 is pivoted relative to the closure element by a further movement of the coupling rod 19. The pivoting element 22 thereby assumes an increasingly orthogonal orientation relative to the closure element 14. In other words, the pivoting element 22 is positioned relative to the closure element 14.

The degrees of freedom of movement of the pivoting element 22 are limited to a movement in the direction of the guide 26 due to the coupling with the further guide element. A transverse movement is thereby excluded. This has the effect that the pivoting element 22 is pivoted as desired in this substep and the closure element 14 is pressed onto the valve seat by the pivoting.

During this process, the restoring element 23 is compressed and its provided restoring force increases. During a countermovement from the closed position to the intermediate position, this restoring force causes the pivoting element to pivot back and thus detaches the closure element 14 from the valve seat.

The arrangement according to the invention and the interaction of guide/guide element and guide/pivoting element enable a described embodiment of a closure system with comparatively few components. The valve, in particular the opening and the closure, can be realized in different sizes with correspondingly identical components and corresponding arrangement. It is also advantageous that the change of the opening state can be carried out in a very controlled manner.

Another major advantage of the invention is that the sealing material is not subjected to transverse stresses during the provided closure and opening processes, thus preventing the formation of impurities (e.g. particles due to abrasion).

At the same time, the arrangement according to the invention makes it possible to close and open the opening comparatively quickly, wherein the complexity of the arrangement is comparatively low, but the robustness is high.

The present curvature of the guide path also allows the closing movement to be slowed down (automatically), which prevents the closure element from hitting the valve seat with an undesired force.

Figure 2B:
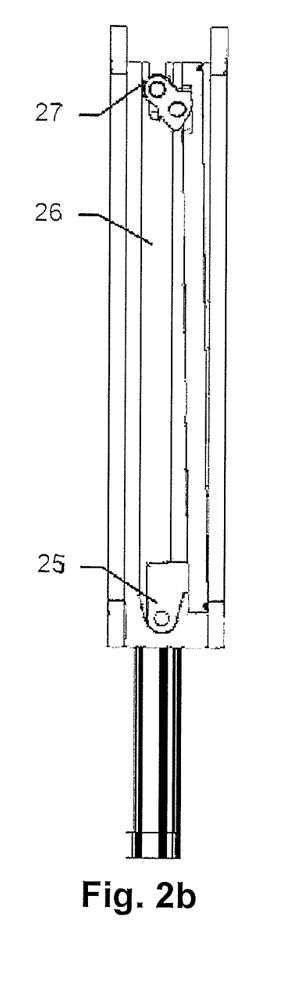
Figure 2C:
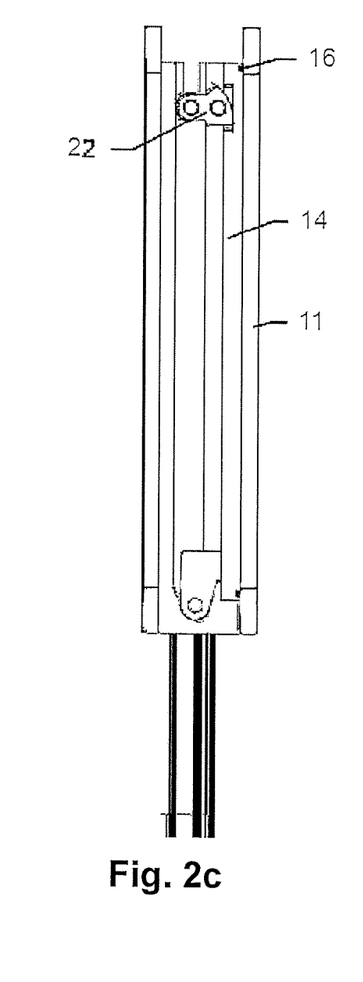

FIGS. 2a-c show another embodiment for a valve closure according to the invention.

FIG. 2a shows the closure element 14' in an intermediate position, in which the closure element 14' is at least partially in a substantially parallel spaced opposite position to the valve seat. Here, the closure element 14' is not opposite all parts of the valve seat.

In the intermediate position, the pivoting element 22' (e.g., implemented as a lug and/or a toggle mechanism) has a tilted position relative to the closure 14'.

FIG. 2b shows the valve closure in a state between the intermediate position and the closed position, in particular after a first partial movement as described with the embodiment according to FIGS. 1a-c. The further guide element 27', which is connected to the pivoting element, is also guided here by means of the guide 26'. The guide element 25' of the closure element 14' is struck against a stop formed by the end of the groove 26'. The seal 16' is pressed onto the waive seat in the area of the curvature 26a'. The closure element 14' protrudes transversely relative to the valve wall.

During the transition from this intermediate state to the closed position (FIG. 2c), the pivoting element 22 is pivoted, causing the closure element 14' to tilt. The tilting corresponds to a pivoting of the closure about an axis defined by the contact area between the seal 16' and the valve seat 12'. The tilting presses the seal 16' circumferentially onto the valve seat 12' and closes the opening 11' in a gas-tight manner. The pivoting element 22 causes the closure element to be locked in this case.

Figure 3:
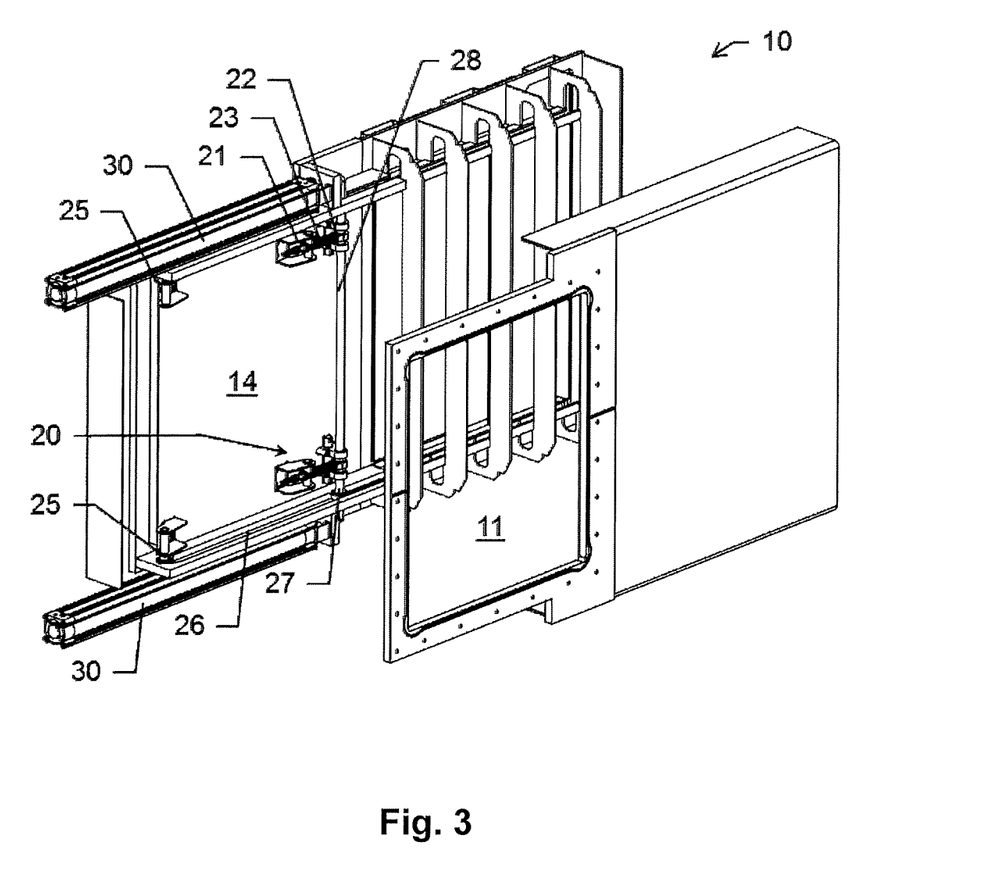
FIG. 3 shows a further embodiment of a vacuum valve according to the invention in perspective view.

FIG. 3 shows an embodiment of a valve 10 according to the invention in the form of a gate valve in a perspective view, wherein a housing of the valve 10 is shown open. The parts which functionally interact in the same way as previously shown valves are marked with the same reference signs.

The valve 10 defines an opening 11, which can be closed with a valve disk 14 or a valve door (closure element). The gate 14 or the door of the valve is designed in this case in a rectangular manner with rounded corners. The valve door 14 can be adjusted by means of a drive. The drive has two pneumatic elements 30, which are arranged on both sides of the opening. A crossbar 28 is connected to both pneumatic elements 30.

The drive can have push rods extending internally in the cylinders. For advance damping of the closing movement, appropriate damping elements can be provided inside the cylinders and/or specific electronic control of the drive motors provided in the cylinder. Such advance damping can already take place before the intermediate position is reached and can also be effected after the intermediate position has been reached.

The crossbar 28 is also coupled to two pivoting elements 22 (toggle elements) of respective coupling units. The coupling units are mounted on the rear side (opposite the closure side) of the valve door 14. A roller 27 (further guide element) is associated with each of the pivoting elements 22, which are connected here by means of the crossbar 28 and arranged thereon. The rollers 27 run in respective guides 26 and are linearly displaceable therein.

FIG. 3 shows the valve 10 in a closed state. The door-side seal is pressed against a housing-side valve seat. This pressing along the entire seal is provided on the one hand by a cooperation of the guides 26 (in particular the curvatures in the guide course) with the guide elements 25 and on the other hand by the cooperation of the guides 26 with the coupling units. The gate is moved by the curvature of the guide 26 in the end phase of a closing movement at least on one side in the direction of the valve seat.

When the valve 10 is opened, the pivoting element 22 is first pivoted by its coupling with the retaining element 21, resulting in a one-sided detachment of the door 14 from the valve seat. Thereafter, the guide element 25 is moved in the adjustment direction (here: to the right) into the open position, resulting in a complete detachment of the seal from the valve seat. Both parts of the movement are provided by the drive.

The closure gate 14 is thus coupled to the crossbar 28 (coupling unit) by means of two lever mechanisms 20. Due to this constructive arrangement, the gate 14 can be varied movably with respect to its distance from the crossbar 28. Springs 23 are in turn attached to the pivoting elements 22, wherein the other ends are attached to the retaining elements 21. Through this, i.e. through the pretensioned fastening of the springs 23, a restoring force is exerted on the gate 14 with respect to the crossbar 28, so that the gate 14 is present in a non-closed state at a defined distance from the crossbar 28 and its movability permits an equally defined increase in the distance due to the design (in particular length and pivotability) of the pivoting elements 22. This adjustment path orthogonally to the extension plane (surface of the closure side directed towards the opening in a valve) of the gate 14 (in the open state) is used to reliably provide a contactless guidance of the closure 14 up to the actual closed position and to achieve, for the closing, a pressing of the seal 16 or the sealing surface of the gate 14 essentially in the normal direction of the sealing surface (i.e. in a direction parallel to the normal to the sealing surface). Unwanted particle formation e.g. due to transverse stressing of the sealing material, can thus be prevented or at least significantly reduced.

It is understood that the figures shown are only schematic illustrations of possible exemplary embodiments. According to the invention, the various approaches can also be combined with each other and with valves for closing process volumes under vacuum conditions of the prior art.

The invention claimed is:

1. A Vacuum valve, for substantially gas-tight closure of an opening defining an opening axis, having
    a closure element having a closure side and a coupling unit arranged on a rear side opposite the closure side,
    a valve wall with a valve seat surrounding the opening,
    a linear drive unit, by means of which the closure element can be adjusted in at least two adjustment directions essentially orthogonally to the opening axis along an adjustment axis and thus the closure element can be adjusted between
        an open position exposing the opening,
        an intermediate position pushed over the opening, in which the closure element is at least partially in a substantially parallel spaced-apart opposite position to the valve seat, and
        a closed position closing the opening, wherein the closure element is pressed with its closing side onto the valve seat and closes the opening, in particular closes it in a gas-tight manner,
    the vacuum valve comprises a guide for the closure element associated with the opening,
    the closure element comprises a guide element interacting with the guide during a displacement from the open position to the closed position and back,
    the guide and the guide element are shaped and interact in such a way that, in the course of the adjustment from the intermediate position into the closed position, a tilting of the closure element transversely to the adjustment axis is initiated and/or effected in a first partial movement;
    wherein the guide consists of one of a group of
        a depression,
        an elongated recess,
        a channel and a
        groove
    defining a guide path; and
    wherein the guide allows the closure element to move with only one degree of freedom of movement, in particular wherein the degree of freedom of movement is defined by the guide path.

2. The Vacuum valve according to claim 1, wherein the tilting is pronounced such that a part of the closure side is pressed onto the valve seat and is in contact with the valve seat at least along a touchdown line, wherein the touchdown line is substantially orthogonal to the opening axis as well as to the adjustment axis.

3. The Vacuum valve according to claim 1 wherein in the course of the adjustment from the intermediate position into the closed position, the closure element is pressed with its closure side onto the valve seat in a second partial movement in such a way that there is circumferential contact between the valve seat and the closure side and the opening is closed.

4. The Vacuum valve according to claim 3 wherein the second partial movement comprises a rotation of the closure element about a touchdown line, wherein the touchdown line is substantially orthogonal to the opening axis as well as to the adjustment axis.

5. The Vacuum valve according to claim 1 wherein the guide provides a stop for the guide element, wherein the first partial movement is limited by the guide element striking against the stop, and the second partial movement is initiated with the striking.

6. The Vacuum valve according to claim 1 wherein the guide is shaped in such a way that
    during a displacement from the open position to the intermediate position and back, a rectilinear movement of the entire closure element takes place along the adjustment axis, and
    in the course of the first partial movement, a transverse movement of at least part of the closure element deviating from the alignment of the adjustment axis takes place and a tilting of the closure element results.

7. The Vacuum valve according to claim 1, wherein the guide path has an at least partially curved course in a region defining the adjustment from the intermediate position into the closed position.

8. The Vacuum valve according claim 1 wherein
    the guide element engages in the guide, and/or the guide element has a sliding element or a roller or is designed as such, and/or the guide element is rigidly connected to the closure element.

9. The Vacuum valve according to claim 1 wherein the coupling unit comprises a further guide element which interacts with the guide at least in the context of the displacement from the intermediate position into the closed position.

10. Vacuum valve according to claim 1 wherein the coupling unit comprises a retaining element rigidly arranged on the rear side of the closure element, a pivoting element pivotally mounted on the rear side of the closure element and a restoring element which is connected to the retaining element and the pivoting element in particular wherein the restoring element is designed as a spring or as an elastic element, and is present in a pretensioned manner in the open position and the intermediate position.

11. The Vacuum valve according to claim 10, wherein a restoring force provided by the restoring element increases as part of the second partial movement into the closed position, wherein the restoring force counteracts the direction of the second partial movement into the closed position.

12. The Vacuum valve according to claim 10 wherein during the second partial movement a pivoting of the pivoting element takes place, whereby the closure element is pressed with its closure side onto the valve seat in such a way that the contact between the valve seat and the closure side is produced circumferentially and the opening is closed.

13. The Vacuum valve according to claim 1 wherein the vacuum valve is a vacuum slide valve.

14. The Vacuum valve according to claim 13 wherein the vacuum slide valve is a gate valve.

15. The Vacuum valve according to claim 10 wherein the spring is a spiral spring.

16. A Vacuum valve, for substantially gas-tight closure of an opening defining an opening axis, having a closure element having a closure side and a coupling unit arranged on a rear side opposite the closure side, a valve wall with a valve seat surrounding the opening, a linear drive unit, by means of which the closure element can be adjusted in at least two adjustment directions essentially orthogonally to the opening axis along an adjustment axis and thus the closure element can be adjusted between an open position exposing the opening, an intermediate position pushed over the opening, in which the closure element is at least partially in a substantially parallel spaced-apart opposite position to the valve seat, and a closed position closing the opening, wherein the closure element is pressed with its closing side onto the valve seat and closes the opening, in particular closes it in a gas-tight manner, the vacuum valve comprises a guide for the closure element associated with the opening, the closure element comprises a guide element interacting with the guide during a displacement from the open position to the closed position and back, the guide and the guide element are shaped and interact in such a way that, in the course of the adjustment from the intermediate position into the closed position, a tilting of the closure element transversely to the adjustment axis is initiated and/or effected in a first partial movement; and wherein the coupling unit comprises a further guide element which interacts with the guide at least in the context of the displacement from the intermediate position into the closed position.

17. A Vacuum valve, for substantially gas-tight closure of an opening defining an opening axis, having a closure element having a closure side and a coupling unit arranged on a rear side opposite the closure side, a valve wall with a valve seat surrounding the opening, a linear drive unit, by means of which the closure element can be adjusted in at least two adjustment directions essentially orthogonally to the opening axis along an adjustment axis and thus the closure element can be adjusted between an open position exposing the opening, an intermediate position pushed over the opening, in which the closure element is at least partially in a substantially parallel spaced-apart opposite position to the valve seat, and a closed position closing the opening, wherein the closure element is pressed with its closing side onto the valve seat and closes the opening, in particular closes it in a gas-tight manner, the vacuum valve comprises a guide for the closure element associated with the opening, the closure element comprises a guide element interacting with the guide during a displacement from the open position to the closed position and back, the guide and the guide element are shaped and interact in such a way that, in the course of the adjustment from the intermediate position into the closed position, a tilting of the closure element transversely to the adjustment axis is initiated and/or effected in a first partial movement; and wherein the coupling unit comprises a retaining element rigidly arranged on the rear side of the closure element, a pivoting element pivotally mounted on the rear side of the closure element and a restoring element which is connected to the retaining element and the pivoting element in particular wherein the restoring element is designed as a spring or as an elastic element, and is present in a pretensioned manner in the open position and the intermediate position.

* * * * *